PRECISE TIMING CIRCUIT WITH LINEAR CHARGE NETWORK
Filed Feb. 11, 1963
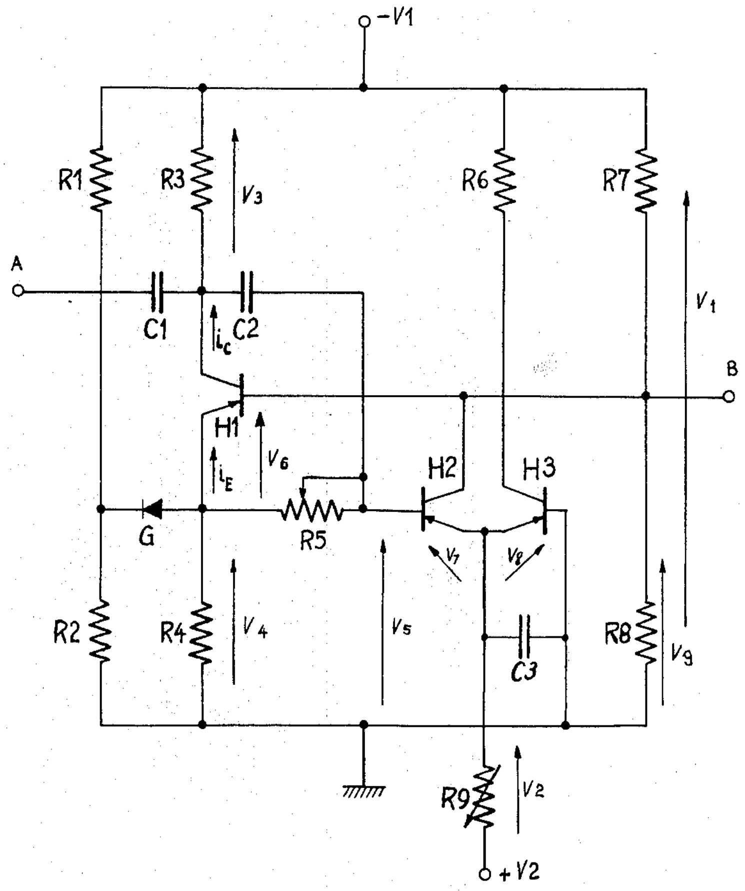
Inventors:
MAX KELLER AND PIERINO PACOZZI
By: McGlew and Toren
Attorneys United States Patent Office 3,231,761

Patented Jan. 25, 1966

3,231,761

PRECISE TIMING CIRCUIT WITH LINEAR CHARGE NETWORK

Max Keller and Pierino Pacozzi, Zurich, Switzerland, assignors to Albiswerk Zurich A.G., Zurich, Switzerland Filed Feb. 11, 1963, Ser. No. 257,558
Claims priority, application Switzerland, Feb. 9, 1962, 1,624/62
6 Claims. (Cl. 307—88.5)

This invention pertains, in general, to electronic timing circuits; and, in particular, an electronic timing circuit having variable time setting means and employing a monostable multivibrator and a differential amplifier.

As is known, radar systems employ timing circuits for measuring the interval of time between a transmitted signal and the reception of a signal reflected by a target. This interval of time is used to determine the distance, or range, between the radar antenna and the target. In order to obtain precise measurement of range, or distance, these timing circuits must have a very linear characteristic. Presently known timing circuits such as the "Phantastron," the "Sanatron," and the "Sanaphant" provide the required linearity. Such circuit arrangements are, in effect, sweep generators which are, in some respects, like multivibrators. They differ, however, in the following respect: Ordinarily, the multivibrator has an exponential time curve due to the use of RC differentiating circuits.

Usually, the above-mentioned circuit arrangements employ a "Miller saw-tooth generator" which is characterized by a linear time curve, rather than an exponential one. The linear time curve is of great advantage in that the duration of the output pulse can be made to depend linearly on the control voltage at an input.

Basically, the "Miller saw-tooth generator" employs a pentode having a grounded cathode. The anode, control grid and screen grid of the pentode are resistance coupled with the positive terminal of a battery. A capacitor is connected between the anode and control grid. A capacitor is connected between the anode and control grid. A suppressor grid of the pentode is resistance coupled with a negative source of bias voltage. With this arrangement the bias voltage of the control grid is initially at zero volts and the suppressor grid has a sufficient negative potential to block the pentode, i.e., that it is non-conductive. The anode is supplied with the full positive potential. The entire cathode current flows to the screen grid. However, as soon as a positive potential impulse is applied to the suppressor grid, the tube becomes conductive and, accordingly, the potential at the anode drops. Because the anode is capacitor coupled with the control grid, the bias voltage at the control grid becomes negative and the anode current is limited to a value determined by the resistance in the anode circuit. This current fed through the capacitor and control grid resistance to the voltage source causes a reduction of the potential at the control grid. The anode current increases, again, until the potential of the anode is substantially zero. Therefore, no current flows in the anode circuit. Accordingly, the potential difference across the capacitor increases until battery voltage is reached. Therefore, current can, again, flow in the screen grid circuit; the bias voltage of the screen grid being substantially reduced to its original value. This condition continues until the pulse applied to the suppressor grid is cut off, at which time the anode potential rises exponentially in accordance with the value of the capacitor and the value of the resistance in the anode circuit. The voltage drop in the anode circuit is a linear function of time.

Vacuum tubes employed in such "Miller saw-tooth generators" will provide fairly good linearity. For example, deviations of the linear time curve not exceeding 0.1% have been achieved. Unfortunately, such linearity has not, heretofore, been achievable with the use of transistors in such circuits.

Accordingly, one object of the present invention is to provide a timing circuit employing transistors which will provide a highly precise linear time curve.

Another object of the present invention is the provision of a timing circuit employing semi-conductor devices rather than vacuum tube devices.

Another object of the present invention is the provision of a timing circuit including variable time-setting means.

Another object of the present invention is to provide a timing circuit which is highly reliable, accurate, economical and relatively simple.

According to an illustrative embodiment of the invention, there is provided a timing circuit comprising a monostable multivibrator which comprises a first amplifier and a second amplifier. The first amplifier includes a transistor and a variable time-setting means; the variable time-setting means being connected between the collector and the emitter electrodes of said transistor. The emitter electrode of the transistor is resistance coupled with the positive terminal of a source, i.e., with ground. The emitter potential during the non-conducting state is derived from a diode through a voltage divider. The second amplifier is a differential amplifier comprising two transistors. The emitters of the two transistors of the second amplifier are commonly coupled; both of these emitters of the two transistors of the second amplifier being kept at positive potentials.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawing there is illustrated, in schematic form, a timing circuit according to the present invention.

The transistor H1 is the amplifier element of the first amplifier circuit. The resistors R3 and R4 are serially coupled with the collector and the emitter electrodes, respectively, of the transistor H1. The resistors R1 and R2 form a voltage divider for distributing a bias voltage to the emitter electrode of the transistor H1; said bias voltage being provided by the diode G. An input terminal A is coupled through the capacitor C1 to the collector electrode of the transistor H1, as shown. The capacitor C2 and the variable resistor R5 are serially connected across the collector and emitter electrodes of transistor H1 and, together, form a time-determining RC circuit.

Two transistors, H2 and H3, connected, as shown, form a differential amplifier. The transistor H2 performs the function of the second transistor of a monostable multivibrator, while transistor H1 performs the function of the first transistor thereof.

The collector electrode of the transistor H2 is commonly coupled with an output terminal B and the base electrode of the transistor H1. The resistors R7 and R8 form a voltage divider which supplies a voltage to the collector electrode of the transistor H2. As shown, the base electrode of the transistor H2 is connected with the common point of the resistor R5 and the capacitor C2. The voltage provided to the emitter electrode of the transistor H2 is obtained from the positive terminal of a voltage source V2, of which the negative terminal is connected to ground, through the variable resistor R9.

Transistor H3 has the same emitter voltage as the transistor H2. The base electrode of the transistor H3 is, as shown, connected to ground and its collector electrode is coupled through the resistor R6 with a negative terminal of the voltage source V1.

The voltage V4 at the emitter of transistor H1 is:

$$V4=V9-V6 \quad (1)$$

The voltage across the resistor R8 is designated as V9 and is:

$$V9=V1\frac{R8}{R7+R8} \quad (2)$$

In Equation 2 it is assumed that transistor H1 is conductive and transistor H2 is blocked. In order to control the current through transistor H1 by the emitter voltage, the voltage derived from the divider comprising the resistors R1 and R2 is disconnected by diode G. By using Equation 1 the current $i_E$ is:

$$i_E=\frac{V4}{R4}=\frac{V9-V6}{R4} \quad (3)$$

The same current $i_E$ also flows through resistor R3. Accordingly, the voltage V3 is:

$$V3=R3\cdot i_E=\frac{R3}{R4}(V9-V6) \quad (4)$$

When transistor H1 is conductive, a current in the base electrode thereof must flow. The condition for base current flow is:

$$\frac{V3}{V4}=\frac{R3\cdot i_C}{R4\cdot i_E}=\frac{R3}{R4}\cdot\frac{1}{1+1/\alpha} \quad (5)$$

With the high order of amplification, $\alpha$, the second fraction of the third identity in the above Equation 5 is practically 1. For practical purposes, a sufficient amplification could be achieved by connecting two transistors in double emitter sequence. In this case the degree of amplification, $\alpha$ total becomes:

$$\alpha\,\text{total}=\alpha 1\alpha\cdot 2 \quad (6)$$

This equation substituted in Equation 5 yields:

$$\frac{V3}{V4}=\frac{R3}{R4} \quad (7)$$

Without a differential amplifier comprising the transistors H2 and H3 the emitter of one transistor would be grounded, as known, and the blocking voltage V5 would be temperature dependent. However, by using the differential amplifier circuitry, the voltage V5 can be resolved into its component voltages as follows:

$$V5=V7-V8 \quad (8)$$

The two voltages V7 and V8 are, in effect, oppositely poled diode voltages (considering the emitter and base electrodes of the P-N-P transistors H2 and H3 in this respect as PN diodes). Should the diode resistance vary as a function of temperature, the difference will always remain the same since emitter current flows through transistor H2, and when the transistor H2 is blocked, emitter current flows through transistor H3.

The operating time $t$ of the multivibrator is determined by the discharge time of the capacitor C2 through the resistance R5:

$$t=R5\cdot C2\left[l_n\left(\frac{R3}{R4}+1\right)+\frac{V5}{V4}\right] \quad (9)$$

By substituting Equation 8 in Equation 9, there is obtained:

$$t=R5\cdot C2\left[l_n\left(\frac{R3}{R4}+1\right)+\frac{V7-V8}{V4}\right] \quad (10)$$

The voltages V7 and V8 can be made equal by adjusting the variable resistor R9 to make the voltage V8 equal to the blocking voltage of the transistor H2. Accordingly, Equation 10 can be simplified as follows:

$$t=R5\cdot C2\left[l_n\left(\frac{R3}{R4}+1\right)\right] \quad (11)$$

When temperature effects on transistor H1 cause a change in the base-emitter voltage V6, it can be demonstrated by using Equation 4 that if the voltage V4 increases, the voltage V6 will be reduced by the same amount. The voltage V3 varies to the same extent as the voltage V4. If the condition $$V7-V8=0$$

is satisfied, the operating time $t$, according to Equation 11 will not change.

In the timing circuit illustrated in the drawing figure, the duration of the output pulse must be proportional to a variable value. Equation 11 shows a linear dependency of the operating time $t$ as defined by the resistor R5 and the capacitor C2. Accordingly, the linearity of the variations of the output pulse may thus be determined, exclusively, by the linearity of either of these two variable elements; i.e., either resistor R5 or capacitor C2.

In the present illustrative example, a variable resistor R5 has been used for reasons of economy. Of course, the capacitor C2 could be variable and the resistor R5 fixed.

In a test circuit, arranged as shown in the drawing figure, a deviation of less than 0.1% of operating time $t$ occurred for temperature changes ranging from between −30° C. to +70° C.

In order to shorten recovery time, the emitters of the transistors H2 and H3 may be, as illustrated, coupled through the capacitor C3 to ground. The charge of the capacitor C3 would additionally charge the capacitor C2 through the diode arrangement hereinbefore discussed of the transistor H2 (the emitter-base circuit) after transistor H2 becomes conductive. In this way, the ratio of pulse duration to the duration of time between successive pulses of 100:1 can readily be obtained.

While a specific embodiment of the invention has been shown and described in detail to illustrate the application of the principles of the invention, it will be understood that this invention may be embodied otherwise without departing from such principles.

What is claimed is:

1. A timing circuit comprising: input terminal means for receiving an input signal; output terminal means for providing an output signal; source means of positive and negative electric potentials; ground terminal means; first, second and third transistors, each including an emitter electrode, a collector electrode and a base electrode, the emitter electrodes of the second and third transistors being commonly connected to said positive potential source means, the collector and base electrodes of said second and first transistors respectively being commonly connected with said output terminal means, the collector electrode of said third transistor being connected to said negative potential means, the base electrode of said third transistor being connected to said ground terminal means, the collector electrode of said first transistor being coupled with said input terminal means; adjustable time-constant circuit means connected between the collector and emitter electrodes of said first transistor, the base electrode of said second transistor being coupled with the collector and emitter electrodes of said first transistor through said time-constant circuit means; and, reference voltage means for establishing a biasing potential on the emitter electrode of said first transistor.

2. A timing circuit, according to claim 1, wherein said adjustable time-constant circuit means comprises a variable resistor and a capacitor connected in series between the emitter and collector electrodes of said first transistor and wherein the base electrode of said second transistor is connected at a point between said series connected capacitor and variable resistor.

3. A timing circuit, according to claim 1, wherein there is included an additional capacitor connected between the ground terminal means and both emitter electrodes of said second and third transistors.

4. A timing circuit comprising a first transistor having an emitter, collector and base; variable time-constant circuit means connected between the collector and emitter of said first transistor; input driving signal means coupled with the collector of said first transistor; reference voltage means for biasing the emitter of said first transistor, said voltage means providing an emitter biasing potential in response to said driving signal means; output signal terminal means connected to the base electrode of said first transistor; second and third transistors, each having an emitter, collector and base, the base of said second transistor being coupled with said variable time-constant circuit means, the collector of said second transistor being connected to the base of said first transistor, the emitters of said second and third transistors being connected together; and, a source of positive potential connected to the emitters of said second and third transistors.

5. A timing circuit comprising: first amplifier means comprising one transistor having an emitter, collector and base; differential amplifier means comprising second and third transistors, each having an emitter, collector and base, said second transistor being coupled with said one transistor to form a monostable multivibrator; time-constant circuit means coupling said one transistor's collector and emitter and said second transistor's base; a source of positive potential, the emitters of said second and third transistors being commonly coupled to said source of positive potential; a source of negative potential, the collector of said third transistor being coupled to said source of negative potential; said second transistor's collector and said one transistor's base being connected; ground terminal means; voltage divider means between said ground terminal means and said source of negative potential; and, biasing means for maintaining a predetermined potential on the emitter of said one transistor.

6. Electronic timing circuit with variable setting time, using a monostable vibrator, characterized in that the monostable multivibrator is composed of two different amplifier circuits, of which the circuit carrying the working current consists of a transistor where the variable time-determining member is arranged between the collector and emitter, the potential of the emitter being connected through a resistance with the positive terminal of a voltage source, the emitter potential during the non-conducting state being derived from a diode through a voltage divider circuit and that the amplifier circuit carrying the feed current is a differential amplifier composed of two transistors, whose common emitter potential is kept positive with regard to ground by the amount of the blocking voltage by means of an additional voltage source.

References Cited by the Examiner

UNITED STATES PATENTS

| | | | |
|---|---|---|---|
| 2,814,736 | 11/1957 | Hamilton | 307—88.5 |
| 2,827,574 | 3/1958 | Schneider | 307—88.5 |
| 2,897,453 | 7/1959 | Mansford | 331—145 |
| 2,959,739 | 11/1960 | Smith | 328—185 |
| 2,987,632 | 6/1961 | Mitford | 307—88.5 |
| 3,084,266 | 4/1963 | Williams | 307—88.5 |

JOHN W. HUCKERT, *Primary Examiner.*

R. SANDLER, *Assistant Examiner.*